Dec. 16, 1952 F. M. VARNEY ET AL 2,621,582
STEMLESS VACUUM COFFEE MAKER
Filed July 13, 1950 3 Sheets-Sheet 1

Inventor
Fred M. Varney
Justin A. Varney

Attorney

Dec. 16, 1952  F. M. VARNEY ET AL  2,621,582
STEMLESS VACUUM COFFEE MAKER
Filed July 13, 1950  3 Sheets-Sheet 2
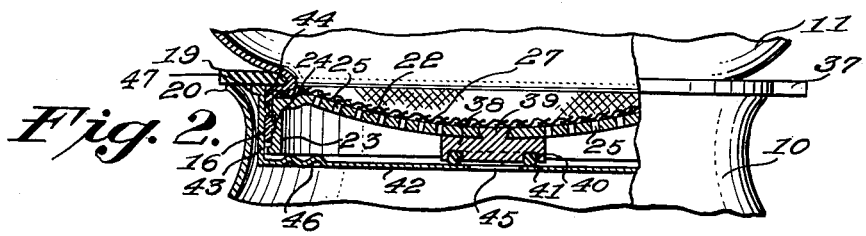
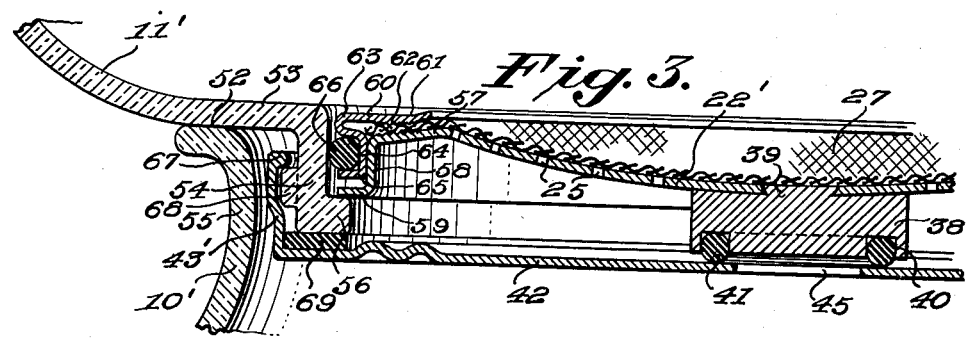
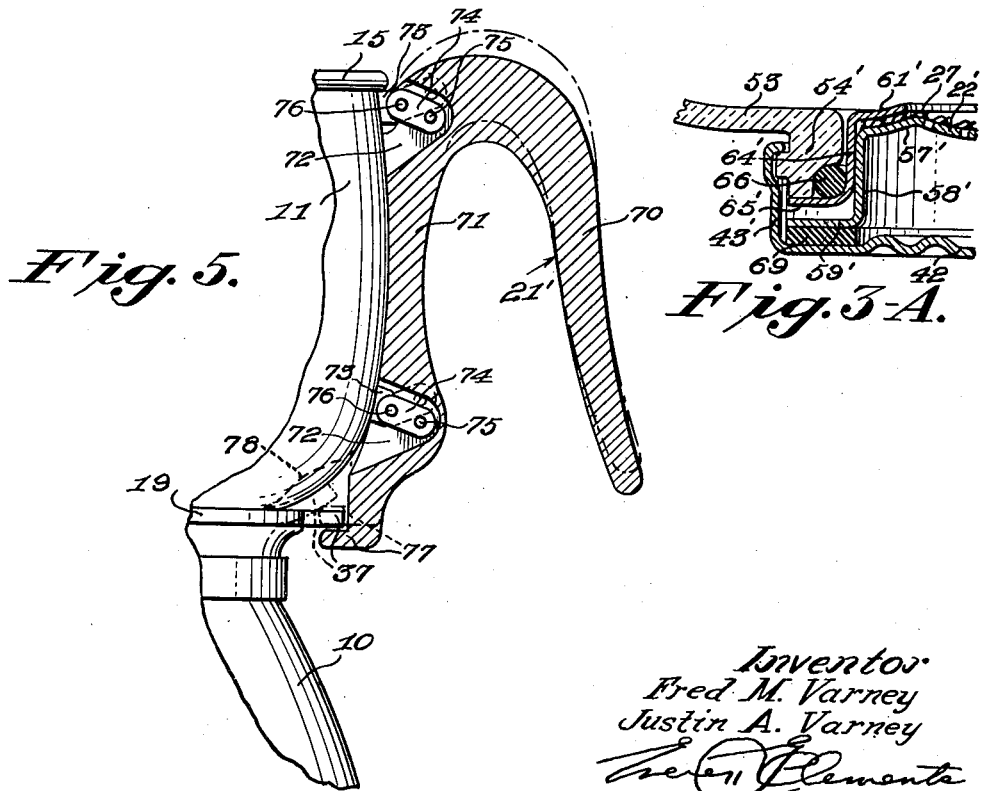
Inventor
Fred M. Varney
Justin A. Varney
Attorney Dec. 16, 1952     F. M. VARNEY ET AL     2,621,582
STEMLESS VACUUM COFFEE MAKER
Filed July 13, 1950     3 Sheets-Sheet 3
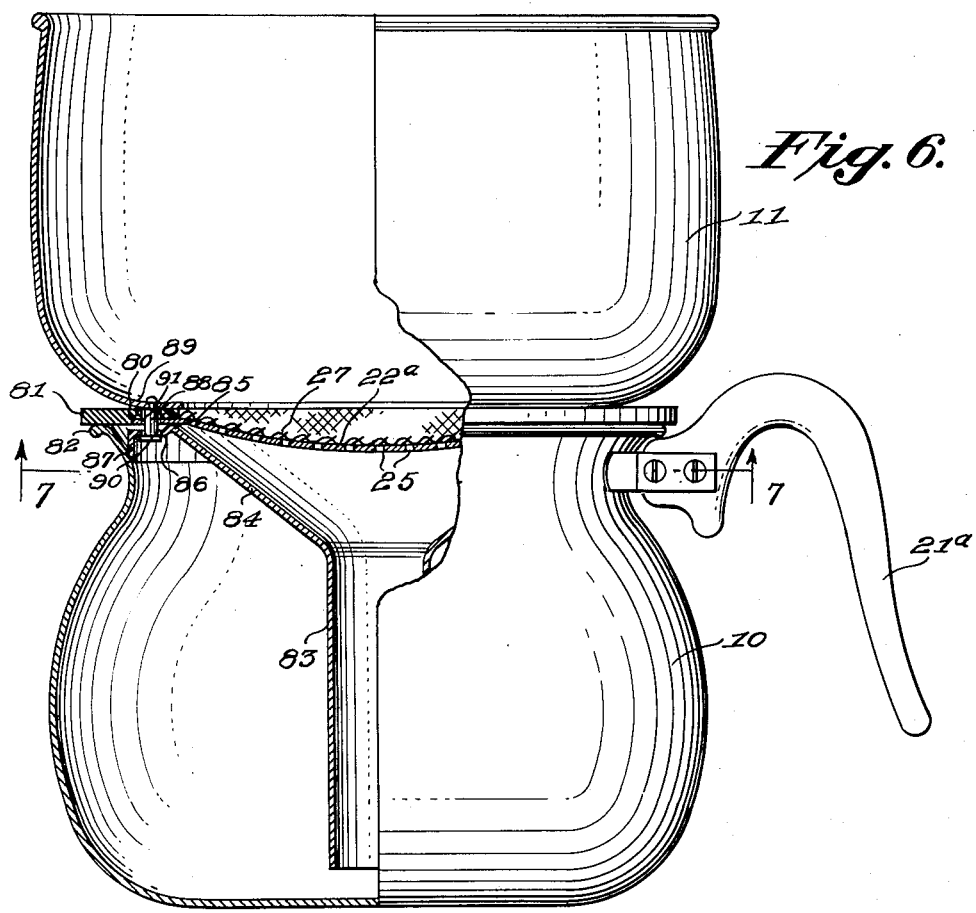
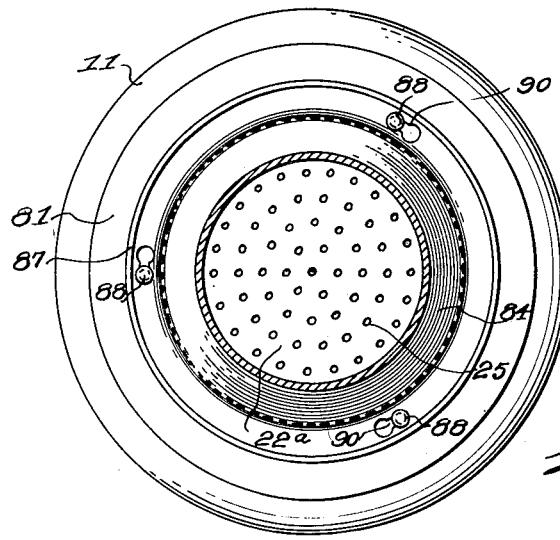
Inventor
Fred M. Varney
Justin A. Varney
Attorney Patented Dec. 16, 1952

2,621,582

UNITED STATES PATENT OFFICE 2,621,582

STEMLESS VACUUM COFFEE MAKER

Fred M. Varney, Westbury, N. Y., and Justin Arnold Varney, Los Angeles, Calif.

Application July 13, 1950, Serial No. 173,542

9 Claims. (Cl. 99—302)

This invention pertains to apparatus for making beverage infusions and has particular reference to improvements in apparatus for making coffee by brewing ground coffee in an upper container or receptacle and filtering the infusion into a supporting lower vessel or receptacle under the differential pressure obtained by the condensation of steam in the latter receptacle.

While the present invention is concerned with the structure and cooperation of the upper and lower receptacles in certain phases thereof, it is more particularly concerned with improved suction valve filter units removably supported by and normally closing the lower end of the brewing receptacle. The present application is therefore concerned with improvements over the structures disclosed in the pending application of Fred M. Varney et al. Serial No. 27,068, filed May 14, 1948.

The valved filter units disclosed in said pending application, while being detachably connected with the lower neck portions of the brewing receptacle involved the preformation of screw threads upon the outer surface of the neck of the brewing receptacle to which the valve element is connected for securing the filter element in place within the neck, and also normally closing the passage through the filter and neck and maining the same closed during a brewing operation.

As the success of the coffee maker depends largely upon the means which maintains a relatively perfect closure between the brewing receptacle and the boiler during the coffee and water mixing and brewing operations, as distinguished from the constantly open hollow stem type vacuum brewers, and to thereafter automatically establish proper communication therethrough for conducting filtered coffee infusion to the lower receptacle or boiler, it has been found desirable, with certain types of valves to support same entirely upon the filter carrying element, whereas with other types of valves the provision of a quick detachable connection with the neck of the brewing receptacle insures the desired mounting of parts for long and continued successive use of the device.

Furthermore, the valved filter unit according to said application is confined to a particular type of coffee maker wherein the water is first boiled in the lower receptacle and then poured over the coffee grounds in the upper receptacle, whereas the filter unit as herein shown and described may be used with improved results in other types of coffee brewers.

It is accordingly an object of this invention to provide a filter unit having an improved connection with the lower neck portion of the brewing receptacles in coffee makers of the type above referred to as well as with the type wherein the water is boiled in the lower receptacle and forced under pressure into the upper brewing receptacle from which the water passes downwardly through ground coffee supported on a filter therein into the lower receptacle under pressure occasioned by subsequent steam condensation in the latter.

A further object of the invention is to provide a coffee maker including a lower boiler receptacle and an upper brewing receptacle having a lower neck portion disposed within the space forming the mouth of the boiler receptacle and wherein the brewing receptacle is provided with a circumferential and laterally extending sealing ring having adjacent its outer perimeter sealing contact with a smooth sealing surface on the boiler receptacle adjacent the mouth thereof.

A still further object of the invention is to provide a coffee maker according to the preceding object wherein the brewing receptacle is provided with a handle movably supported thereon and having a lip engageable with the edge of the sealing ring and operative to raise it and thereby break the seal upon initial movement of the handle.

Other objects and advantages of the invention will present themselves in the course of the following detailed description, taken in connection with the accompanying drawings, wherein—

Fig. 2 is a fragmental view of the brewing and boiler receptacles, partially in side elevation, but mostly in vertical section, the receptacles being shown in operative association as in Fig. 1 but wherein is disclosed a modified form of filter unit.

Fig. 3 is a fragmental vertical sectional view on a substantially larger scale than Figs. 1 and 2 and disclosing a still further structural embodiment of the invention.

Fig. 3-A is a fragmental vertical sectional view disclosing a still further embodiment of the invention.

Figure 1:
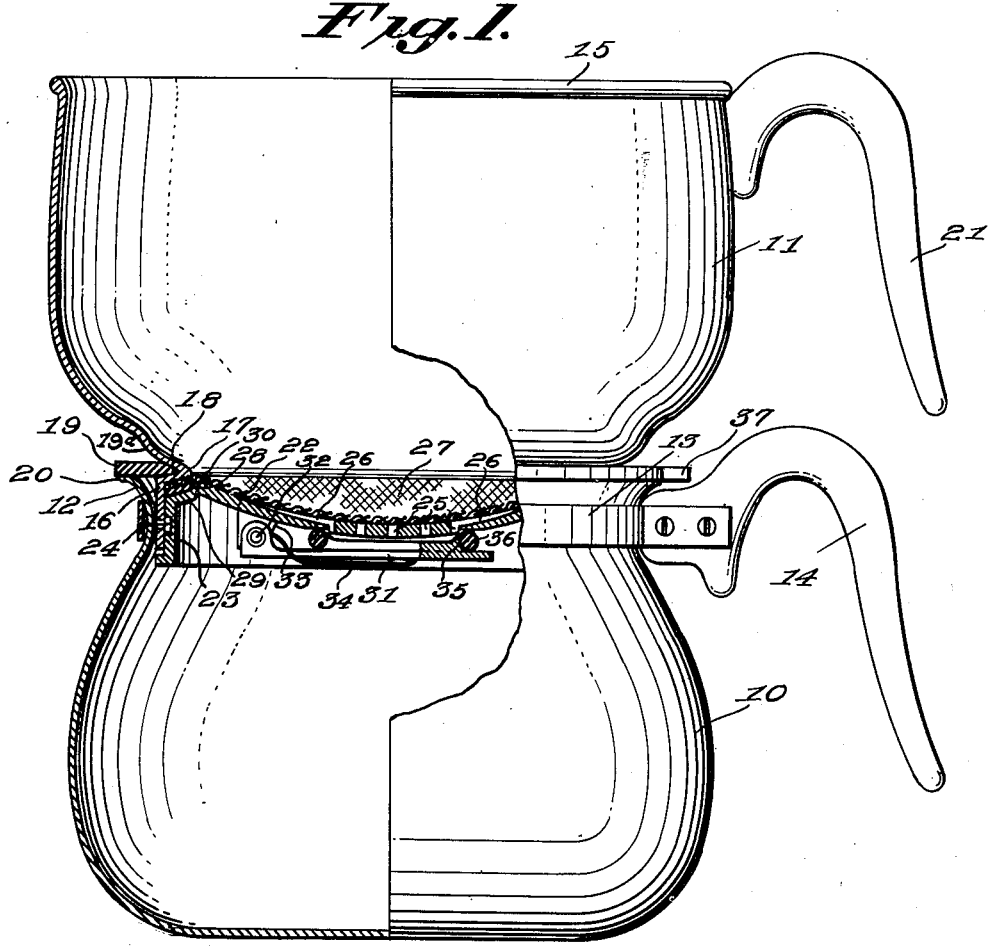
Fig. 1 is a view partially in side elevation and partially in vertical section and disclosing structural features of one embodiment of the invention with the brewing receptacle seated upon the boiler receptacle for simultaneous operations of brewing coffee in the first receptacle and generating steam in the second receptacle to exhaust air therefrom.
Figure 4:
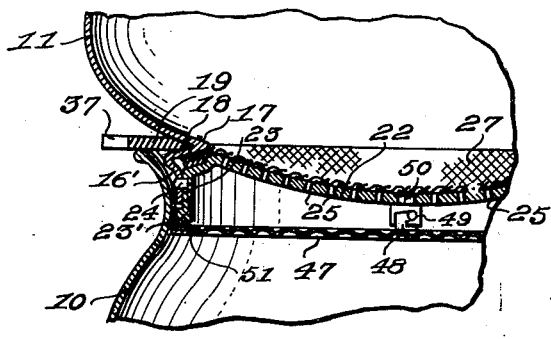

Fig. 4 is a fragmental vertical sectional view disclosing a structure similar to that of Fig. 1 but wherein the filter unit is of a modified form.

Fig. 5 is a fragmental view showing portions of the brewing and boiler receptacles in side elevation and showing a handle in section which is movably connected to the brewing receptacle and is operative to break the seal between the receptacles and thereafter lift the brewing receptacle from the boiler receptacle.

Fig. 6 is a view similar to Fig. 1 but showing a funnel-type of coffee maker having a still further modified form of filter structure embodied therein.

Fig. 7 is a horizontal sectional view in the plane of line 7—7 on Fig. 6 with the receptacle 10 omitted for greater clarity of disclosure.

Referring now more specifically to the accompanying drawings, wherein like numerals designate like parts in the different views, and referring first to Fig. 1, the improved coffee maker comprises a lower filtrate receiving receptacle and boiler 10 and an upper brewing receptacle 11. The receptacle 10 is in the form of a flask or beaker substantially as disclosed in said pending application, and may be constructed of suitable metal or any other desired material. The receptacle 10 has a neck portion 12 which is curved in the provision of an annular recess in which is received a supporting strap or clamp 13 to which is secured a handle 14 substantially as is also disclosed in said copending application. As is shown, the inside diameter of the brewing receptacle 11 is slightly greater than the outside diameter of the boiler receptacle 10, whereby the latter may be nested in the former in order to conserve storage space when the coffee maker is not in use.

The upper brewing receptacle 11 has an outwardly flaring upper open end or rim 15 and an open diametrically reduced lower end in the form of a depending flange 16, and the receptacle is formed with an inwardly directed rib 17 from which the flange 16 depends the rib providing an external circular groove 18 in which is seated the inner edge of a sealing gasket 19 of rubber or other similar material. The gasket is preferably of a normal internal diameter such that it is under stress when its inner edge is disposed in the groove thereby providing an effective seal between the gasket and the wall of the groove. The gasket 19 is of a width such that it rests upon the upper edge 20 of the neck portion 12 which is formed with a smooth uniform seating surface for the gasket.

The brewing receptacle 11 is also preferably provided with a handle 21 for more efficient handling of same. An automatic valve controlled filter unit is removably supported by the flange 16, which together with the flanges are disposed beneath the upper edge 20 of the receptacle 10 in the assembled position of the receptacles 10 and 11.

The filter unit includes a downwardly dished filter element supporting plate 22 having a vertically disposed peripheral flange 23 snugly receivable within the receptacle flange 16, and which is removably disposed therein. The flanges 16 and 23 are provided with cooperating bayonet slots and lugs for locking same in assembled position substantially in the manner indicated at 55—70 in the Varney et al. patent referred to, one of such lugs being shown at 24 in Fig. 1 and similar bayonet connections being shown in Fig. 7. The plate 22 is provided with a plurality of apertures 25 adjacent the central lowermost portion thereof, and the plate is further provided with channels 26 radiating from the outermost apertures 25 to points adjacent the outer periphery of the dished portion of the plate.

Overlying the plate 22 is a filter element 27 which is preferably constructed of glass fiber or other non-absorbent cloth and whose peripheral edge is disposed between the lower outwardly and downwardly flared wall of rib 17 and a gasket 28 which is seated on an upwardly and inwardly flared wall 29 on the plate 22, which wall interconnects the upper edge of flange 23 with the outer edge of the dished portion of the plate. A shoulder 30 is provided at the juncture of the flange 23 and the said dished plate portion for engaging one edge of gasket 28 and whose opposite edge engages flange 16 in the assembled position of the parts described.

The apertures 25 are controlled by a valve structure which includes a plate 31 underlying the plate 22 and which has one edge thereof pivotally connected at 32 to a lug or lugs 33 rigid with and depending from the plate 22. A spring 34 has one end thereof connected with the lug 33 and the other or free end of the spring bears against the bottom of the pivoted plate 31 and yieldably urges same upwardly toward the plate 22. The plate 31 is provided with a circular recess 35 in which is compressibly engaged a yieldable sealing ring-form gasket 36 which through the action of spring 34 normally sealingly engages the plate 22 in a circular line in circumscribing relation to the apertures 25.

The operation of the improved coffee maker in accordance with the embodiment above described is substantially as in said co-pending application and is briefly as follows:

A quantity of ground coffee is placed upon the filter element 27. A quantity of water is then placed in the boiler receptacle 10 and is brought to a boil on a burner as disclosed in said co-pending application. The bulk of this hot water is then poured into the brewing receptacle 11 upon the ground coffee therein, and during this operation, the brewing receptacle may conveniently rest on the lower edge of flange 23 upon any desired supporting surface.

A small quantity of water is retained in the boiler receptacle, and the boiler receptacle is put back on the burner. The brewing receptacle is then seated on the boiler receptacle with the basket 19 engaging the edge 20 thereby forming a valved closure for the boiler receptacle.

As the water boils in receptacle 10, the steam generated escapes directly to the atmosphere by lifting gasket 19 from its seat 20. When sufficient steam has been generated to expel the air from the receptacle 10, and when the coffee has brewed a desired length of time the assembled receptacles may be removed from the heating means and allowed to cool, whereupon the condensing steam in the receptacle 10 will create a partial vacuum therein, since the valved connection 19—20 will effectively prevent return flow of air to the boiler receptacle. This lowering of pressure within the receptacle 10 will cause valve 31, 36 to open under atmospheric pressure whereupon the pressure difference between the upper and lower receptacles will cause a rapid flow of the coffee infusion through the filter element 27 and the apertures 25 in the plate 22 into the boiler receptacle 10.

While the differential pressure between the upper and lower receptacles will tend to approach a balance when air passes through the filter unit after the flow of the coffee infusion has ceased, the flow resistance of the filter unit may delay the approaching of a balance, with the effect that the sealing gasket 19 may grip its seat 20 for an appreciable time interval after filtration has ended, making it difficult to remove the upper receptacle 11 from the lower receptacle 10. Accordingly, sufficient vertical clearance is provided between the lower part of the brewing receptacle 11, along an annular zone 19a immediately above the seat 20, and the gasket 19, so that the gasket, in flexing under the load imposed upon it by the vacuum, will not be brought into compression, i. e. will not be cramped, between the receptacle 11 and the seat 20. This clearance space, indicated at 19a allows the gasket to be lifted by hand locally from its seat 20 to break the seal. A tab 37 is preferably provided on the gasket 19 to facilitate lifting the edge of the gasket for this purpose.

The modified embodiment of the invention as illustrated in Fig. 2 is substantially the same as that of Fig. 1 so far as the assembly of the receptacles are concerned as well as the structure of the filter plate and the filter element. The structure of Fig. 2 which is common to that of Fig. 1 has been designated by the same reference characters.

The filter control valve in Fig. 2, however, is substantially different from that of Fig. 1. In Fig. 1 the coffee infusion in its flow from the upper to the lower receptacles is confined to a restricted central portion of the filter plate while in accordance with the embodiment of Fig. 2 the filter plate 22 is provided with apertures 25 throughout the whole range of its dished portion with the exception of the central portion to which is rigidly secured a block 38 as by means of a rivet connection 39, and the block is provided with a circular recess 40 in which is suitably fixed a sealing ring 41 of rubber or like material.

A circular plate or diaphragm 42 underlies the block 38 as well as the flanges 16 and 23, and such plate is provided with a vertically disposed marginal flange 43 which is telescopically engageable over the outer wall of flange 16 and is preferably removably connected thereto as by bayonet slots and lugs of the character above referred to and as generally indicated at 44. This flange 43 seals against the gasket 19. The valve plate 42 is provided with a central opening 45 which is disposed within the confines of the sealing ring 41 and the plate is preferably concentrically corrugated adjacent its flange 43 as at 46 to enhance its flexibility.

In this form of the invention, differential pressure resulting from the generation of steam in receptacle 10 causes plate or diaphragm 42 to yield downwardly at its center, whereby it moves away from ring 41 and allows the coffee infusion to flow beneath the ring and through the opening 45 into the lower receptacle.

In this form of the invention, the filter plate passes the coffee infusion throughout substantially its entire area, and since the diaphragm or plate 42 will be somewhat concave interiorly thereof when moved away from ring 41, the flow of the infusion to the discharge opening 45 will be facilitated.

Provision is made for breaking the seal between the gasket 19 and its seat 20 of a different type from that shown in the embodiment shown in Fig. 1. A shoulder or flange 47 which serves as a stop is provided as an integral part of the marginal flange 43. Upon engaging the mouth of the boiler receptacle 10 just below and inside the seat 20 this shoulder 47 limits the travel of the brewing receptacle 11 downward with respect to the receptacle 10 together with the flexing of the gasket 19 which occur simultaneously under the force due to the vacuum in the receptacle 10. Limiting the travel prevents the gasket from becoming compressed or cramped between the seat 20 and that portion of the lower surface of the receptacle 11 immediately above the seat, and thereby allows the gasket to be lifted locally by hand off its seat 20 for seal breaking purposes.

The invention according to the embodiment of Fig. 4 is similar to that of Fig. 2, but differs therefrom essentially in that the flexible valve plate or diaphragm is fixed centrally to the filter plate and its perimeter acts as a valve in cooperation with the lower edge of the filter plate.

The depending flange 16' on the brewing receptacle is in accordance with this embodiment provided with a stop in the form of an outwardly directed rib 16' below the gasket 19 and at the mouth of the gasket receiving groove 18, which, by coming to rest against the mouth of the boiler 10, limits the downward movement of the receptacle 11 and the flexing of the gasket 19 under the force of the vacuum during and after filtration, thereby permitting seal breaking by preventing the gasket from becoming cramped between the bottom of the receptacle 11 and the mouth of the boiler receptacle 10. In accordance with this embodiment a flexible corrugated plate or diaphragm 47 is disposed below the filter plate 22 and is provided centrally thereof with a post 48 having a bayonet slot and lug connection 49 with a socket member 50 rigidly secured to filter plate 22. The diaphragm 47 is provided with a gasket 51 at its perimeter which sealingly engages a thickened lower edge on flange 23 as indicated at 23' and which is preferably transversely rounded as shown. This construction functions similarly to that of Fig. 2 except that the coffee infusion flows from beneath the flange 23' into the lower boiler receptacle instead of through an opening in the center of the diaphragm as in Fig. 2. It may be noted that the resilience that permits relative motion of the rim of the diaphragm and the annular surface against which it seals need not necessarily be provided in the diaphragm itself and that the valving can be controlled by resilience in either the diaphragm, the plate 22, or the member 48, or even in the gasket 51.

The embodiment of the invention as illustrated in Fig. 3 is more particularly concerned with a coffee maker wherein the brewing and boiler receptacles are of glass, pyrex or the like, rather than metal as in the previously described embodiments. In this embodiment, the upper and lower receptacles have direct contact in their superposed operative position as in said copending application, and a ground glass seal 52 is provided between the upper edge of the boiler receptacle 10' and the lower inturned wall portion 53 of the upper brewing receptacle 11'. The brewing receptacle 11' is provided with a vertical flange 54 depending from the inner edge of wall portion 53, and said flange is spaced from the wall of the mouth 55 of the boiler receptacle 10'.

The flange 54 is provided at its lower edge with an inwardly directed rib 56 on which the filter unit is supported, which unit is disposed within the flange 54 below the upper face of the bottom wall portion 53 of the upper brewing receptacle 11'.

The filter unit comprises a filter plate 22' having apertures 25 therein. The filter plate is provided with a marginal wall 57 which inclines outwardly and downwardly from the horizontal, the plate being further provided with a vertical flange 58 depending from the outer edge of wall 57 which merges into a horizontal flange 59 seating on the rib 56. A glass fiber filter element 27 is disposed upon plate 22' with its margin overlying the wall 57.

A combined filter element retaining and filter unit sealing ring assembly is provided and comprises a ring including a generally horizontal wall 60 having a marginal portion 61 inclined upwardly and inwardly in substantial parallelism with the wall 57, which together with the wall are preferably toothed or serrated at 62 for firmly retaining the filter element 27 in position on the plate 22'.

The ring further includes a marginal bend 63 merging into a vertical flange 64 having snug engagement with flange 58, and the flange 64 merges into a horizontal flange 65 which with flange 64 and bend 63 provides a circular groove in which is seated a sealing ring 66 having sealing engagement with the inner wall of the upper receptacle flange 54.

The valve structure according to this embodiment is similar to that of Fig. 2 and includes a block 38 rigidly secured to plate 22' centrally thereof as at 39. The block is provided with a recess 40 in which is suitably fixed a sealing ring 41. A plate or diaphragm 42 underlies the block 38 and is provided with a marginal flange 43' having an inturned bead 67 which is notched at intervals for receiving lugs 68 on the outer wall of flange 54 whereby the diaphragm is removably secured to the brewing receptacle in a well known manner.

A gasket 69 is disposed between the diaphragm 42 and the lower face of rip 56 and the diaphragm is provided with a central coffee infusion discharge opening 45 as in Fig. 2.

The embodiment of the invention according to Fig. 3–A is similar to that of Fig. 3. In this form, however, the flange 54 is modified to assume that of 54' in Fig. 3–A which is of substantially less vertical extent than flange 54 and the flanges 65' and 59' directly underlie the flanges 54' with the former directly engaging the lower edge of the flange 54'. The vertical flanges 58' and 64' respectively, are in engagement and are also disposed close to the inner wall of the flange 54', which flange 54' is recessed at its lower inner corner and the sealing ring 66 is disposed within such recess and confined by the vertical and horizontal flanges 64' and 65' of the filter retaining ring 61'.

In Fig. 5 is disclosed a modified form of handle 21' for the brewing receptacle 11, and such handle is adapted for successively breaking the seal of ring 19 and lifting of the receptacle 11 from the boiler receptacle 10. As shown, the handle comprises an outer depending hand grip portion 70 and a shank portion 71 which is disposed substantially vertically and adjacent the outer wall of the receptacle 11. The shank 71 is provided with recesses 72 adjacent its upper and lower ends and disposed opposite to lugs 73 rigid with and projecting laterally from the wall of the receptacle 11. A link 74 is disposed in each recess 72 and has its opposite ends pivotally connected as at 75 and 76 to the shank 71 and lug 73 respectively.

The shank normally rests by gravity against the wall of the receptacle 11 with the links 74 extending downwardly and outwardly away from the receptacle wall so that upon lifting of the grip portion 70, the shank 71 will be moved away from the receptacle wall and upwardly to the position indicated in dotted lines, and when in such upper position the shank may again engage the receptacle wall with the links extending upwardly and outwardly from the receptacle wall.

The shank 71 is provided with a lip 77 at its lower end which is disposed immediately below the seal breaking tab 37 so as to engage the tab, whereby upon upward movement of the shank, the lip moves to the dotted position and moves the tab also to the dotted position for effecting breaking of the seal by the ring 19. When the handle is in the dotted position with the seal broken, the brewing receptacle 11 may readily be lifted from the boiler receptacle 10. The lip 77 may if desired be attached to the tab 37 to insure more positive lifting of the tab for seal breaking purposes.

The gasket 19 may in flexing under the force of the vacuum become cramped or compressed between the mouth of the receptacle 10 and the lower surface of the receptacle 11. A dent 78 is provided in the wall of the receptacle 11 above the gasket 19 for local relief of the cramping of the gasket. The gasket may be lifted into this dent to break the seal.

The improved valve controlled filter units have been above referred to in operative association with upper brewing receptacles and lower brewing receptacle for flow through the filter units under reduced pressure in the boiler receptacles in the manner disclosed in said copending application. The improved filter units are not, however, confined to such type of coffee makers but are also applicable to the "Cory" type of coffee maker, such as disclosed for example in the patent to Cory No. 2,359,405, October 3, 1944, in which type the heated water is forced from the boiler receptacle upwardly through the filter, and then, under reduced pressure in the boiler receptacle as effected by steam condensation therein, drawn downwardly through the ground coffee and the filter on which the coffee is supported.

A coffee maker of this general type is disclosed in Figs. 6 and 7 and comprises the lower boiler receptacle 10 and the upper brewing receptacle 11, wherein the receptacle 10 is provided with a suitable handle 21a. In accordance with this embodiment, the filter unit is not valved since water heated in receptacle 10 must pass upwardly through the filter unit. The filter unit comprises a downwardly dished filter plate 22a provided with apertures 25 and the margin of the plate is plane and is seated in a recess 80 in the lower face of a sealing ring 81 which has sealing contact with the curved lip 82 of the boiler receptacle 10.

A glass fiber filter element 27 is disposed upon the upper face of plate 22a and has its marginal portion extending into the sealing ring 81. A funnel member 83 is provided and includes an upper inverted frusto-conical wall portion 84 the base portion of which includes an upwardly directed ridge 85 merging into a horizontal ring portion 86 which in turn merges into a downwardly directed flange 87.

The brewing receptacle 11 is provided with a plurality (such as six) of studs 88 which depend from the inturned base portion 89 of the receptacle 11 and have their upper ends riveted therein. The ring portion 86 is provided with bayonet slots 90, and the sealing ring 81 together with the margins of the plate 22ᵃ and filter element 27 are provided with similar bayonet slots 91 whereby the funnel member and filter unit are separately removable from the receptacle 11 in successive order.

It is to be noted that in the assembled relation of the receptacles 10 and 11, the lower edge of flange 87 engages the inner outwardly flared wall of receptacle 10 upon sealing contact of ring 81 with the lip 82 and the ridge 85 engages the plate 22ᵃ in a circular line under and adjacent the inner edge of ring 81 thereby providing proper support of the brewing receptacle and associated filter unit and funnel member on the boiler receptacle 10.

Operation of this embodiment is as follows:

The water in the boiler 10 is brought to a boil and the brewing receptacle 11 is then held down by hand to prevent escape of steam through the seal 81—82 long enough to force the water up through the tube 83 and filter 27 into the brewing receptacle. The coffee is then allowed to brew, steam escaping, as in the other embodiments here disclosed, from the boiler directly past the valve-like seal 81—82 to the atmosphere, by passing and thus avoiding over-heating of the brewing coffee when the coffee has brewed long enough the assembly 10—11 is removed from the burner; thereupon the steam in the boiler condenses and the vacuum generated draws the coffee through the filter into the boiler. The seal 81—82 may then be broken by lifting the edge of the gasket 81. It will be seen that the flange 87, in engaging the flared surface of the receptacle 10, prevents cramping of the gasket 81 between the lower portion of the brewing receptacle 11 and the neck of the receptacle 10 under the force of the vacuum, and thus serves to facilitate lifting of the edge of the gasket 81 from the lip 82 for seal breaking purposes.

From the foregoing, the construction of the various embodiments of the invention should be understood. Since various changes will readily occur to those skilled in the art, the invention is not to be limited to the foregoing description and annexed drawings, but all permissible modifications and variations may be resorted to falling within the scope of the appended claims.

What we claim and desire to secure by U. S. Letters Patent is:

1. In a vacuum filtering coffee maker including a lower boiler receptacle having an upper mouth carrying a finished sealing surface and an upper brewing receptacle having a lower open neck, a circular elastic sealing gasket having its inner edge supported by said brewing receptacle and being sealingly engageable with said surface, and a handle carried by the outer wall of said brewing receptacle and having a connection therewith for limited vertical movement of the handle relative to the receptacle, and a lip carried by the handle to engage the outer edge of said gasket and operative to lift same upon upward movement of the handle.

2. The structure according to claim 1 wherein said handle comprises a hand grip portion and a shank portion, the shank portion having an edge conforming in vertical direction to the outer wall of the brewing receptacle and normally engaging same under gravity, a pair of vertically spaced lugs carried by the wall of said receptacle, recesses in said shank opposite said lugs and links in said recesses having the opposite ends thereof pivotally connected to said lugs and the walls of said recesses.

3. In a coffee maker, an open top steam generating boiler receptacle, a brewing receptacle having top and bottom open ends, said brewing receptacle seated adjacent its lower end upon said boiler receptacle and normally closing the open top of said boiler receptacle, a partition extending entirely across said lower end of the brewing receptacle and precluding passage of fluid from the boiler receptacle into the brewing receptacle, a steam escape valve disposed between said receptacles and externally of said brewing receptacle, and a spring biased valve in said partition operable by atmospheric pressure upon cooling and subsequent reduction of pressure in the boiler receptacle after the escape of steam therefrom through said first valve for rapidly admitting brewed coffee through said second valve from said brewing receptacle and into said boiler receptacle, said steam escape valve comprising a circular gasket having a lower face for fluid sealing contact with the upper edge of said boiler receptacle, and said brewing receptacle having an outwardly facing groove in which the inner edge of said gasket is seated in sealing engagement with the brewing receptacle.

4. The structure according to claim 3 wherein said brewing receptacle is provided with an inwardly directed rib and wherein said partition includes a filter plate having a central downwardly arched perforated portion and a circular marginal portion disposed beneath and in spaced generally parallel relation to the lower surface of said rib, and a filter element resting on said filter plate and including a marginal portion supported between said marginal portion of the filter plate and said lower surface of the rib.

5. The structure according to claim 3 wherein said spring biased valve comprises in combination with a centrally apertured filter plate included in said partition, a plate disposed beneath said filter plate and having an edge pivotally connected thereto, spring means yieldably urging said last plate toward said filter plate, a circular recess in said last plate, and a ring-form gasket disposed within said recess and engageable with the lower face of said filter plate in encircling relation to the apertures therein.

6. The structure according to claim 3, wherein said spring biased valve comprises in combination with an apertured filter plate included in said partition, a block secured to and depending from the center of the plate, a circular sealing ring fixed to said block with a portion depending from the lower face of the block, a disk-form yieldable diaphragm disposed beneath said filter plate in spaced relation thereto with its central portion yieldably engaged with said sealing ring, and a coffee infusion discharge opening in said diaphragm within the confines of said sealing ring.

7. The structure according to claim 6, wherein said diaphragm is provided with a marginal cylindrical flange, engageable with the outer surface of the lower open end of the brewing receptacle, and a bayonet slot connection between said flange and said lower end of the brewing receptacle.

8. The structure according to claim 3 wherein said spring biased valve comprises in combination with a downwardly arched apertured filter plate included in said partition, said plate having a downwardly directed marginal flange terminating in a free bearing edge, a yieldable diaphragm below and in spaced relation to said filter plate and being centrally connected thereto and the margin of said diaphragm normally engaging said flange free edge.

9. The structure according to claim 8 wherein said diaphragm is provided with concentric corrugations, and said connection comprising a socket member on the plate and a post on the diaphragm having detachable connection with each other.

FRED M. VARNEY.
JUSTIN ARNOLD VARNEY.

REFERENCES CITED

The following references are of record in the file of this patent:

UNITED STATES PATENTS

| Number | Name | Date |
| --- | --- | --- |
| 1,479,245 | Kelly | Jan. 1, 1924 |
| 1,822,238 | Albanese | Sept. 8, 1931 |
| 2,314,018 | Sanderson | Mar. 16, 1943 |
| 2,314,543 | Kopf | Mar. 23, 1943 |
| 2,359,405 | Cory | Oct. 3, 1944 |
| 2,360,569 | Masin | Oct. 17, 1944 |
| 2,401,529 | Varney et al. | June 4, 1946 |
| 2,409,226 | Schlumbohm | Oct. 15, 1946 |
| 2,489,785 | Kershaw et al. | Nov. 29, 1949 |
| 2,528,253 | Sullivan | Oct. 31, 1950 |

FOREIGN PATENTS

| Number | Country | Date |
| --- | --- | --- |
| 363,181 | France | Apr. 26, 1906 |